United States Patent [19]

Chahabadi et al.

[11] Patent Number: 4,797,874
[45] Date of Patent: Jan. 10, 1989

[54] CIRCUIT ARRANGEMENT FOR THE TRANSMISSION OF COMMUNICATION SIGNALS

[75] Inventors: Ziaedin Chahabadi, Bad Münder; Christian Prenner, Langenhagen, both of Fed. Rep. of Germany

[73] Assignee: kabelmetal electro Gesellschaft mit beschränkter Haftung, Hanover, Fed. Rep. of Germany

[21] Appl. No.: 86,104

[22] Filed: Aug. 14, 1987

[30] Foreign Application Priority Data

Sep. 29, 1986 [DE] Fed. Rep. of Germany ....... 3633057

[51] Int. Cl.⁴ .............................. H04J 1/16; H04J 3/14
[52] U.S. Cl. .......................................... 370/16; 370/71; 379/2
[58] Field of Search ...................... 370/13, 16, 71–73, 370/69.1

[56] References Cited

U.S. PATENT DOCUMENTS

| | | | |
|---|---|---|---|
| 4,197,435 | 4/1980 | Jackson et al. | 379/2 |
| 4,451,708 | 5/1984 | Kemler et al. | 379/2 |
| 4,462,058 | 7/1984 | Ziegler | 379/2 |
| 4,575,584 | 3/1986 | Smith et al. | 379/2 |

Primary Examiner—Douglas W. Olms
Assistant Examiner—W. Chin
Attorney, Agent, or Firm—Martin A. Farber

[57] ABSTRACT

A circuit arrangement is disclosed by which one of two subscribers (T1, T2) can be connected to a subscriber line (ASL) of the public telecommunication network if a device (2) associated with both subscribers (T1, T2) experiences trouble. The two subscribers (T1, T2) are, in normal operation, both connected to the subscriber line (ASL). Transmission of the signals takes place in this case between the device (2) and an office of the telecommunication network digitally over the subscriber line (ASL). In the event of a disturbance, one subscriber (T1) can be connected by a bypass line (8) to the office with analog signal transfer.

5 Claims, 1 Drawing Sheet

CIRCUIT ARRANGEMENT FOR THE TRANSMISSION OF COMMUNICATION SIGNALS

FIELD AND BACKGROUND OF THE INVENTION

The present invention relates to a circuit for the transmission of communication signals between a central office and two subscribers which are connected to the central office via a common subscriber line, in which the signals are transmitted from the central office in digital form over the subscriber line to a device in which the incoming digital signals are converted into analog signals and vice versa, the two subscribers being connected to the conversion device over cables.

Such a circuit arrangement is used, for instance, in the "PCM-2" method employed by the Post Office of the Federal Republic of Germany. In that method, two spatially adjacent subscribers to the public telecommunication network are both connected to the office by the same subscriber line. The letters "PCM" stand for the well known pulse code modulation method, by which communication signals are transmitted as digital signals.

In the PCM-2 method, the analog signals are digitalized in the office and sent out on the subscriber line. At the end of the subscriber line there is installed a device by which the incoming digital signals are converted back into analog signals. This is true, of course, also of the opposite direction. The two subscribers are connected to the device by cables. Because of the digital transmission of the signals, the two subscribers can telephone simultaneously without interfering with each other. The two flows of signals are "interlaced" by the well-known technique at the starting end of the subscriber line and then separated again at the end thereof. The two subscribers therefore need not know that they are both using the same subscriber line.

No problems arise with this system as long as the device operates free of disturbance. Disturbances of the device are also unproblematical if the device is accessible at all times. However, difficulties result if disturbances cannot be repaired rapidly and if access cannot be readily had to the device. This is the case when the device is installed on the premises of one of the subscribers, as will normally be the case because of considerations of cost and security. It may then happen that the device is not accessible for a lengthy period of time, for instance during the absence of that subscriber on vacation. If trouble in the device occurs during such time, this disturbance cannot be eliminated. The one subscriber, therefore, cannot telephone as long as the subscriber at whose premises the device is installed is still on vacation. In addition to this, even if the subscriber at whose premises the device is installed is there, it may be difficult to get at the device if only the telephone of the other subscriber is experiencing trouble. The telephone of the subscriber who has the device may not be affected thereby. He then does not see any necessity, without lengthy explanations, of permitting a repairman to enter his premises.

SUMMARY OF THE INVENTION

The object of the present invention is to provide a circuit for a digital transmission system in which two subscribers are connected jointly to a subscriber line via a device which converts digital signals into analog signals and vice versa, and which provides assurance that upon the failure of the device, at least one of the subscribers can continue to telephone.

In a circuit of the aforementioned type this object is achieved in accordance with the invention in the manner that a first switch is arranged in the subscriber line and a second switch is arranged in the cable of the one subscriber, these switches being functionally coupled with each other and being electrically connected to each other by a bypass line;

a measuring device which detects the dc voltage present on the subscriber line and is electrically connected to both the switches is connected to the subscriber line between the central office and the first switch;

if the voltage present on the measurement device is less than a predetermined voltage value then the bypass line can be connected, with disconnection of the device, to the subscriber line and to the cable of the one subscriber, and if a predetermined voltage value is exceeded on the measuring device then the device can be connected, with disconnection of the bypass line, to the subscriber line and to the cable of said subscriber.

Advantageous features of the invention can be noted from the ensuing description.

With this circuit arrangement the conversion device is, if necessary, disconnected by the switches from the subscriber line and from the cable of the one subscriber. This subscriber is then connected directly to the subscriber line via the bypass line. He can then telephone in traditional manner with analog transmission of the signals. After repair of the device this switching is then reversed. Both subscribers can then telephone again.

This circuit arrangement is of particular advantage if the device is installed at one of the subscriber's whose premises are not accessible. This subscriber is disconnected from the subscriber line by the switching. He can then no longer telephone. If he now immediately reports the "trouble" it can be rapidly eliminated. However, the trouble may possibly also be repaired only after a long time, namely when this subscriber returns from vacation and only then notes the "trouble."

The switching is effected in simple manner from the central office upon report of a disturbance and then after the elimination thereof. If the device is to be bypassed in the event of a disturbance, the remote feed in the central office will be interrupted for a short time (about 2 seconds). The input voltage, at the device, which is detected by the measuring device, then drops to such an extent, for instance to below 23 volts, that the two switches respond due to a signal from the measuring device. They thereby disconnect the device and connect the bypass line. The subscriber at whose premises the device is not installed can telephone again, namely with analog signal transmission. A corresponding switching must be effected in the central office. In particular, the remote feed for the device is disconnected. The actuation of the switches which has been described takes place automatically when a short circuit occurs in the device.

The reconnecting of the switches is also effected by means of a signal from the measuring device which detects only the dc voltage present, while the ringing voltage which may possibly occur is filtered out. The switching is effected, for example, upon a voltage of more than 75 volts which is only reached if the feed voltage (about 93 volts) of the remote feed for the device is present. After the device has been repaired, the remote feed is therefore again connected by the central office. Upon this switching, the telephone of the subscriber at whose premises the device is not installed must be hung up since otherwise the voltage at the measuring device collapses.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

From a central office of the public telecommunication network, designated "Office 1", there extends subscriber line ASL. At the end of the subscriber line there is arranged a device 2 in which, in addition to other functions, digital communication signals are converted into analog signals and vice versa. Two subscribers T1 and T2 are connected via cables 3 and 4 to the device 2.

In normal operation, the signal transmission between the central office 1 and the subscribers T1 and T2 takes place in the manner that the signals are transmitted in digital form over the subscriber line. They are converted into analog signals either in the central office 1 or in the device 2. The digitalizing of the analog signals is also effected in the central office 1 or in the device 2. It is immaterial in this connection whether only one of the subscribers T1 and T2 is telephoning or whether both the subscribers are telephoning simultaneously.

Figure 1:
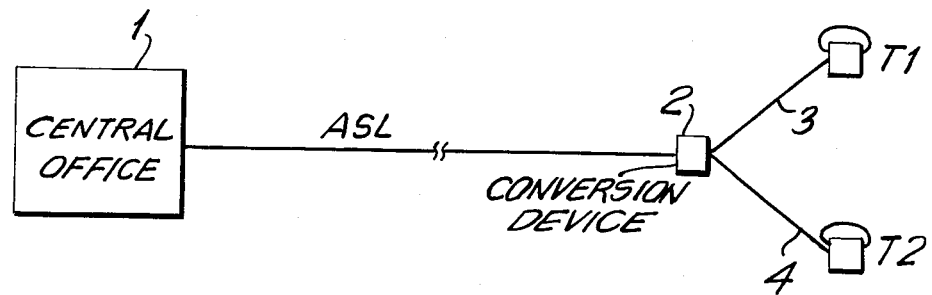
FIG. 1 shows diagrammatically a portion of a telecommunication network.
Figure 2:
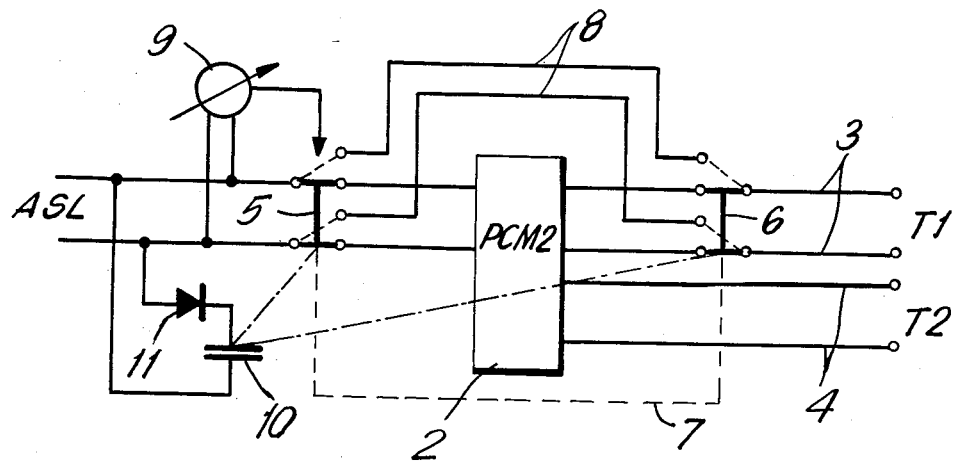
FIG. 2 shows the circuit of the invention, also diagrammatically.

In the event of a disturbance, assurance is provided by the circuit arrangement shown in FIG. 2 that the subscriber T1, bypassing the device 2, can telephone with analog signal transmission over the subscriber line ASL. For this purpose, a first switch 5 is connected in the subscriber line and a second switch 6 is connected in the cable 3 of the subscriber T1. Both switches 5 and 6 are preferably developed as bistable relays. They are coupled to each other, as indicated by the dot-dash line 7. The switches 5 and 6 are connected to each other by a bypass line 8. To the subscriber line ASL there is connected a measuring device 9 by which the dc voltage present on the subscriber line can be measured. The measuring device 9 is connected between central office 1 and first switch 5 to the subscriber line.

FIG. 2 shows the circuit arrangement for normal operation. The switches 5 and 6 are therefore in such position that the device 2 is connected to the subscriber line and that both subscribers T1 and T2 are connected to the device 2 by their cables 3 and 4. The circuit arrangement operates as follows in the case of a disturbance in device 2 which cannot be repaired within a short time:

After report of the disturbance, the remote feed of the device 2 is interrupted for a short time in the central office 1. The duration of the interruption can be about 2 seconds. As a result, the voltage on the input of the device 2 drops below a value adjusted on the measurement device 9. This value is, for instance, 23 volts direct voltage. If the voltage is less than this, then the measurement device 9 gives off a signal by which the switches 5 and 6 switch and then assume the position shown in dashed line in the drawing. In this position, the bypass line 8 is connected to the subscriber line ASL and to the cable 3 of the subscriber T1. The device 2 is separated at the same time from both lines. The subscriber T1 at whose premises the device 2 is not installed, can now telephone with analog signal transmission. The remote feed for the device 2 is interrupted in the central office 1.

After elimination of the disturbance, the remote feed for the device 2 is again connected in the central office 1. It can be about 93 volts. If now a predetermined voltage value of, for instance, 75 volts dc voltage is exceeded on the measuring device 9, then the measuring device 9 gives off a signal by which the two switches 5 and 6 are switched back into the position shown in FIG. 2. Telephoning can then be effected in normal operation by both subscribers T1 and T2. The bypass line 8 is again disconnected. A corresponding switching is again to be effected also in the central office 1.

The reswitching described is only possible if the telephone of the subscriber T1 is hung up, since otherwise the voltage necessary for the response of the measuring device 9 is not reached. Only the dc voltage present on the subscriber line is measured on the measuring device 9. Any superimposed ringing voltage which may be present is filtered out.

The current supply for the actuating of the switches 5 and 6 is possible, in principle, from any suitable source of energy. In the preferred embodiment, a capacitor 10 is used as source of energy, it being connected to the subscriber line with the interposition of a rectifier circuit 11, for instance a known Graetz circuit. The capacitor 10 is, for example, charged by the feed voltage of the remote feed rapidly to the maximum voltage value. It is so dimensioned that the energy stored is definitely sufficient to actuate the switches 5 and 6. Any disturbing reaction by the capacitor 10 on the subscriber line or the transmission of the signal is then excluded, in particular also because of the rectifier circuit 11.

We claim:

1. In a circuit arrangement for the transmission of intelligence signals between a central office and two subscribers who are connected over a common subscriber line to the central office, wherein the intelligence signals are transmitted from the central office over the subscriber line in digital form to a conversion device in which incoming digital signals are converted into analog signals and vice versa, and wherein the conversion device is connected to the two subscribers by cables; the improvement comprising a first switch connected to the subscriber line;

a second switch connected to a cable of one of the subscribers, said first and said second switches being operatively coupled to each other;

a bypass line electrically connecting said first switch to said second switch;

a measuring device which detects a dc voltage present on the subscriber line, said measuring device being connected to the subscriber line between the central office and said first switch, said measuring device being electrically connected to said first and said second switches for operating each of said switches; and wherein said measurement device responds to a voltage which is less than a predetermined value by operating each of said switches to connect the bypass line to the subscriber line and to the cable of one subscriber while disconnecting said conversion device; and said measuring device responds to a voltage which exceeds a predetermined voltage by operating each of said switches to connect said conversion device to the subscriber line and to the cable of said subscriber while disconnecting said bypass line.

2. A circuit arrangement according to claim 1, wherein
said first and said second switches comprise bistable relays.

3. A circuit arrangement according to claim 1, further comprising a source of energy for actuating said first and said second switches, said source of energy comprising:
a capacitor and a rectifier, said capacitor being connected to the subscriber line by said rectifier.

4. A circuit arrangement according to claim 2, further comprising a source of energy for actuating said first and said second switches, said source of energy comprising:
a capacitor and a rectifier, said capacitor being connected to the subscriber line by said rectifier.

5. A circuit arrangement according to claim 1, wherein
said conversion device is installed in space at the one subscriber, and said second switch is connected to the cable of a second of said subscribers.

* * * * *